US012467243B2

(12) United States Patent
Chang et al.

(10) Patent No.: US 12,467,243 B2
(45) Date of Patent: Nov. 11, 2025

(54) MAGNETIC SHOWER HEAD

(71) Applicant: Xiamen EASO Co., Ltd., Xiamen (CN)

(72) Inventors: Yang-Yu Chang, Xiamen (CN); Haitao Lu, Xiamen (CN); Zhen Li, Xiamen (CN)

(73) Assignee: Xiamen EASO Co., Ltd., Xiamen (CN)

( * ) Notice: Subject to any disclaimer, the term of this patent is extended or adjusted under 35 U.S.C. 154(b) by 135 days.

(21) Appl. No.: 18/520,599

(22) Filed: Nov. 28, 2023

(65) Prior Publication Data

US 2025/0043553 A1 Feb. 6, 2025

(30) Foreign Application Priority Data

Aug. 3, 2023 (CN) ......................... 202310970429.2

(51) Int. Cl.

*E03C 1/06* (2006.01)
*B05B 15/60* (2018.01)
*B05B 15/62* (2018.01)
*B05B 15/65* (2018.01)

(52) U.S. Cl.

CPC ................ *E03C 1/06* (2013.01); *B05B 15/62* (2018.02); *B05B 15/60* (2018.02); *B05B 15/65* (2018.02)

(58) Field of Classification Search

CPC ...... E03C 1/06; E03C 1/066; E03C 2001/082; E03C 1/025; B05B 15/65; B05B 15/60; B05B 15/62
USPC ............. 4/596, 605, 615; 239/273, 282, 283
See application file for complete search history.

(56) References Cited

U.S. PATENT DOCUMENTS

| | | | | |
|---|---|---|---|---|
| 9,919,331 | B2 * | 3/2018 | Scheffer | E03C 1/06 |
| 2019/0083991 | A1 * | 3/2019 | Lin | B05B 1/185 |
| 2023/0407613 | A1 * | 12/2023 | Li | E03C 1/06 |
| 2024/0240440 | A1 * | 7/2024 | Huang | B05B 15/62 |

* cited by examiner

*Primary Examiner* — David J Walczak
(74) *Attorney, Agent, or Firm* — Jose Cherson Weissbrot

(57) ABSTRACT

A magnetic shower head includes a fixed seat and a body, where a groove is formed at the back of the body, and a protruding part allowed to extend into the groove is formed at the fixed seat, a first magnetic suction member is formed at end face of the bottom of the groove, and a second magnetic suction member is formed at the protruding part, the first magnetic suction member is allowed to be connected with the second magnetic suction member; a mounting space located on a peripheral side of the groove is formed at the body, and the mounting space connected to the groove, a latch is formed on the mounting space, and the latch is allowed to move along the radial direction of the groove and extend into the interior of the groove, a slot is formed at a peripheral side of the groove.

19 Claims, 10 Drawing Sheets

MAGNETIC SHOWER HEAD

CROSS REFERENCE TO THE RELATED APPLICATIONS

This application is based upon and claims priority to Chinese Patent Application No. 202310970429.2, filed on Aug. 3, 2023, the entire contents of which are incorporated herein by reference.

FIELD OF THE INVENTION

The present invention relates to a magnetic shower head.

BACKGROUND

Many magnetic showers on the market are directly through the magnetic force of the magnetic suction parts to adsorb the shower and fixed seat together, and this way need to rely on a larger magnetic force to make the two parts can be very good fixed adsorption together, but this will result in the removal of the shower needs to spend a lot of force. The magnetic suction on the market now is not mechanically fixed, which cause the shower is easy to fall from the fixed seat, and it is very likely that the showerhead will hit the user when it falls down, at the same time, the existing common showerhead in the put to take, people need more energy to identify the location of the fixed seat, more inconvenient, greatly reducing the user experience.

BRIEF SUMMARY OF THE INVENTION

In order to solve the above technical problems, the purpose of the present invention is to provide a magnetic shower head.

The present invention is realized by the following technical solutions:

A magnetic shower head, comprising a fixed seat and a body, a groove is formed at the back of the body, and a protruding part that can extend into the groove is formed at the fixed seat, wherein a first magnetic suction member is formed at end face of the bottom of the groove, and a second magnetic suction member is formed at the protruding part, the first magnetic suction member can be connected with the second magnetic suction member; a mounting space which is located on a peripheral side of the groove is formed at the body, and the mounting space connected to the groove, a latch is formed on the mounting space, and the latch can move along the radial direction of the groove and extend into the interior of the groove, a slot is formed at a peripheral side of the groove that corresponds to the position of the latch, and the latch can be cooperatively connected with the slot to connect the body and the fixed seat together.

In embodiments of the present invention, the peripheral side of the protruding part is also provided with a magnetic suction member that can be cooperatively connected with the latch, and when the protruding part extends into the groove, the magnetic suction member can drive the latch to move along the radial direction of the groove toward the slot and insert it into the interior the slot.

In embodiments of the present invention, an open pore is formed between the mounting space and groove, one end of the latch can pass through the open pore and extend into the slot, between one other end of the latch and one end of the mounting space near the groove are provided with a first spring, and the first spring is located in the mounting space and is in a state of compression in the radial direction along the groove; when the force of the first spring on the latch is greater than that of the magnetic suction member on the latch, the latch is not mated with the slot.

In embodiments of the present invention, the slot is a curved slot provided on the outer peripheral wall of the protruding part, the slot extends in the direction of the outer peripheral side of the protruding part, and the magnetic suction member is provided in the protruding part located in the inner periphery of the slot.

In embodiments of the present invention, the body comprises a first body and a panel matingly connected, the groove is arranged at one end of the panel facing the first body, and the first body is provided with an opening corresponding to the groove, and the protruding part can be inserted into the groove through the opening.

In embodiments of the present invention, one end of the panel facing the opening is provided with a convex boss, the middle of the convex boss is recessed to form the groove, the outer peripheral wall of the convex boss is recessed in the direction of the groove to form a first recessed portion for installing the latch, the inner peripheral wall of the convex boss is provided with the open pore that can match the first recessed portion, and the first body located on the outer peripheral side of the convex boss is provided with a baffle, the baffle and the first recessed portion cooperate to form the mounting space.

In embodiments of the present invention, the convex boss is further provided with a second recessed portion, the second recessed portion is provided with a second spring in a compressed state along the radial direction of the groove, and the second spring is matingly connected with a positioning bead, the peripheral wall of said protruding part is provided with a positioning recess, and the positioning bead is capable of being moved toward the positioning recess along the radial direction of the groove under the action of the second spring and matingly connected with the positioning recess.

In embodiments of the present invention, the positioning bead is cooperatively connected with the positioning recess, the force of the first spring on the latch is less than the force of the magnetic suction member on the latch, and the latch is inserted into the slot.

In embodiments of the present invention, the baffle is an annular baffle, and first recessed portion is located at one end of the peripheral side of the convex boss and is matingly connected to the baffle, the second spring is located between the baffle and the positioning bead.

The present invention of a magnetic shower head, has the following beneficial effects: 1. the mechanical locking structure is more stable than the magnetic structure, and is not easy to fall off, while removing the shower can be more labor-saving. 2. the way to rotate and switch to unlock is also relatively simple, and there is no need to set more openings in the appearance, and the appearance is simple, which is more conducive to the easy processing and manufacturing. 3. the structure of mechanical locking is relatively simple, the number of parts is small, and the assembly process is simple.

BRIEF DESCRIPTION OF THE SEVERAL VIEWS OF THE DRAWINGS

In order to more clearly illustrate the technical scheme of the present invention, the following will be a brief introduction to the embodiment or the drawings required to be used in the description of the prior art. Obviously, the drawings in the following description are only some examples of the present invention. For ordinary technical personnel in the art, without paying creative labor, other drawings can also be obtained based on these drawings.

DETAILED DESCRIPTION OF THE INVENTION

Figure 1:
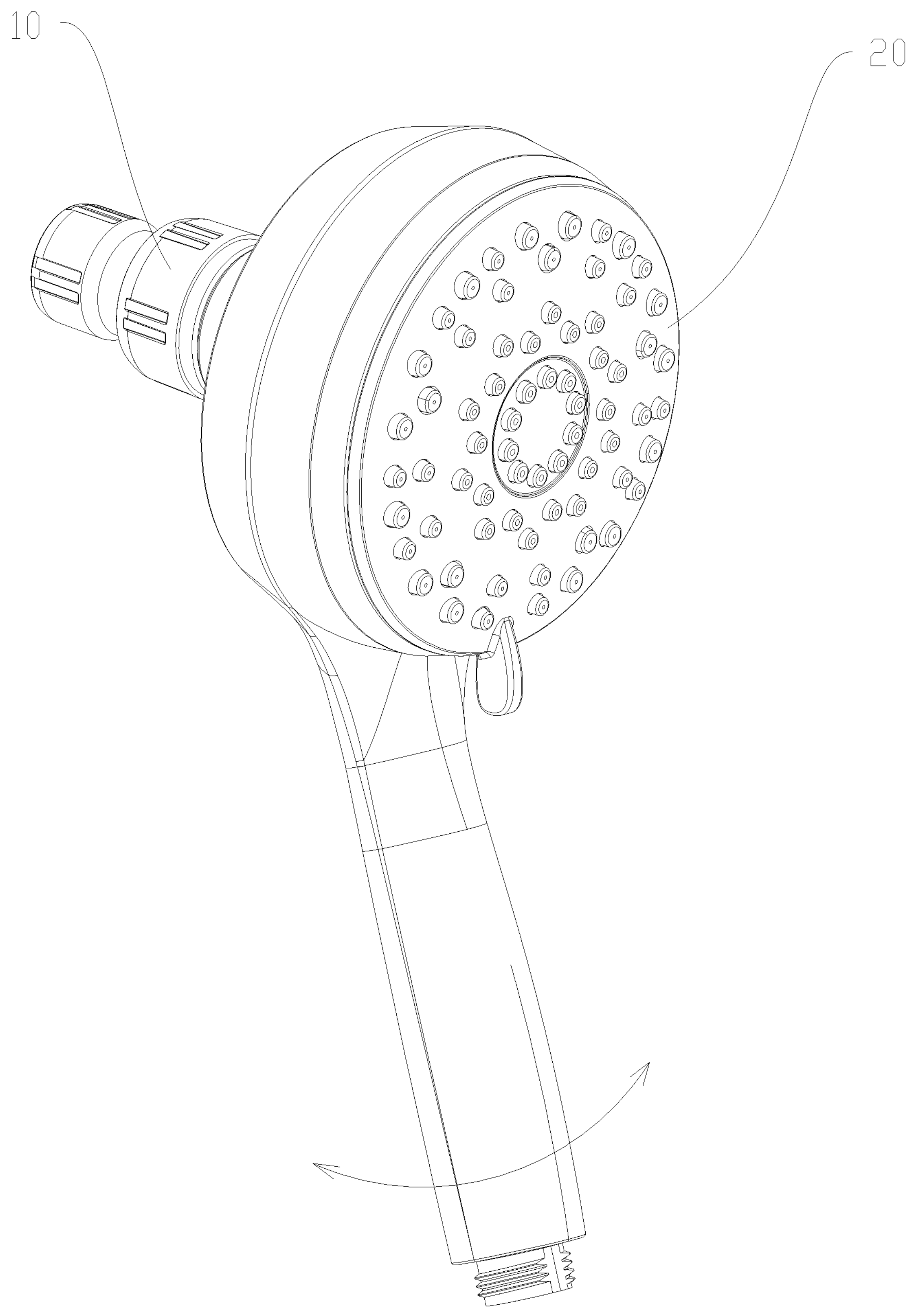
FIG. 1 is a perspective view of the present invention.

In order to make the objects, technical solutions and advantages of the embodiments of the present invention clearer, the technical solutions in the embodiments of the present invention will be described clearly and completely in the following in conjunction with the accompanying drawings in the embodiments of the present invention, and it is clear that the embodiments described are a part of the embodiments of the present invention and not all of the embodiments. Based on the embodiments in the present invention, all other embodiments obtained by a person of ordinary skill in the art without making creative labor fall within the scope of protection of the present invention. Accordingly, the following detailed description of the embodiments of the present invention provided in the accompanying drawings is not intended to limit the scope of the present invention for which protection is claimed, but rather represents only selected embodiments of the present invention. Based on the embodiments in the present invention, all other embodiments obtained by a person of ordinary skill in the art without creative labor fall within the scope of protection of the present invention.

In the description of the present invention, it is to be understood that the terms "center", "longitudinal", "lateral", "length", "width", "thickness", "top", "bottom", "front", "back", "left", "right", "vertical", "horizontal", "top", "bottom", "inside", "outside," "clockwise," "counterclockwise," and the like indicate orientation or positional relationships based on those shown in the accompanying drawings, solely for the purpose of facilitating description of the present invention and simplifying the description, they are not intended to indicate or imply that the devices or elements referred to must have a particular orientation, be constructed and operated in a particular orientation, and therefore are not to be construed as a limitation of the present invention.

Furthermore, the terms "first" and "second" are used for descriptive purposes only and are not to be understood as indicating or implying relative importance or implicitly specifying the number of technical features indicated. Thus, a feature defined with the terms "first", "second" may explicitly or implicitly include one or more such features. In the description of the present invention, "more than one" means two or more, unless otherwise expressly and specifically limited.

In the present invention, unless otherwise expressly provided and limited, the terms "mounted", "linked", "connected", "fixed", etc. are to be understood in a broad sense. The terms "mounted", "connected", "connected", "fixed", etc. are to be understood in a broad sense, for example, it can be a fixed connection, a removable connection, or a one-piece connection; it can be a mechanical connection or an electrical connection; it can be a direct connection or an indirect connection through an intermediary medium, and it can be a connectivity within the two elements or an interaction between the two elements. For those of ordinary skill in the art, the specific meanings of the above terms in the present invention may be understood on a case-by-case basis.

In the present invention, unless otherwise expressly provided and limited, "over" or "under" the first feature of the second feature may include direct contact of the first and second features, or may include contact of the first and second features not directly but by means of an additional feature between them. The first feature is in contact with the second feature. Furthermore, the first feature being "above", "above" and "above" the second feature includes the first feature being directly above and diagonally above the second feature, or simply indicating that the first feature is horizontally higher than the second feature. above the second feature. The first feature being "below", "under", and "beneath" the second feature includes the first feature being directly below and diagonally below the second feature, or simply indicating that the first feature is horizontally smaller than the second feature.

Figure 4:
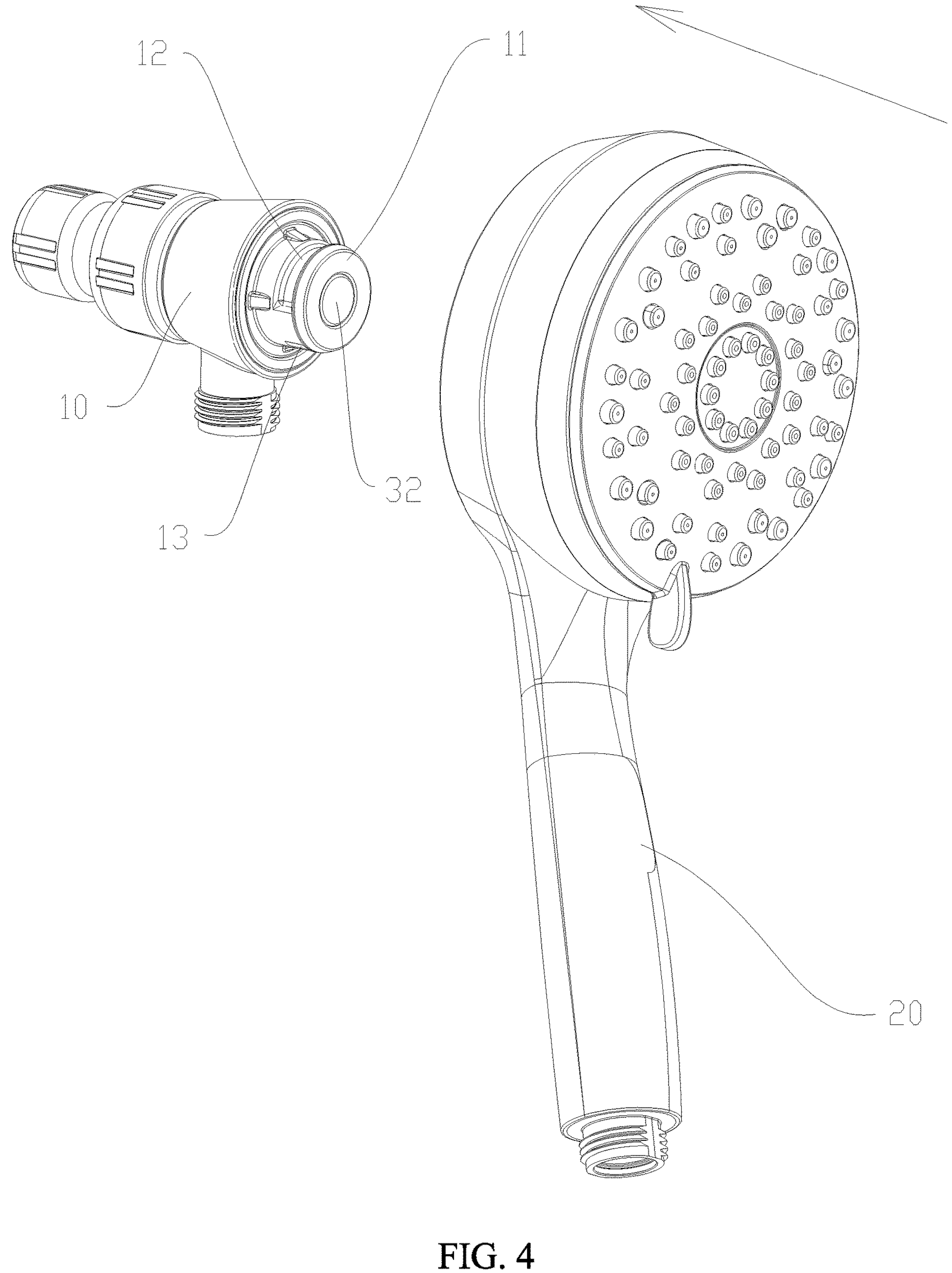
FIG. 4 is a schematic diagram of state III of the present invention.
Figure 5:
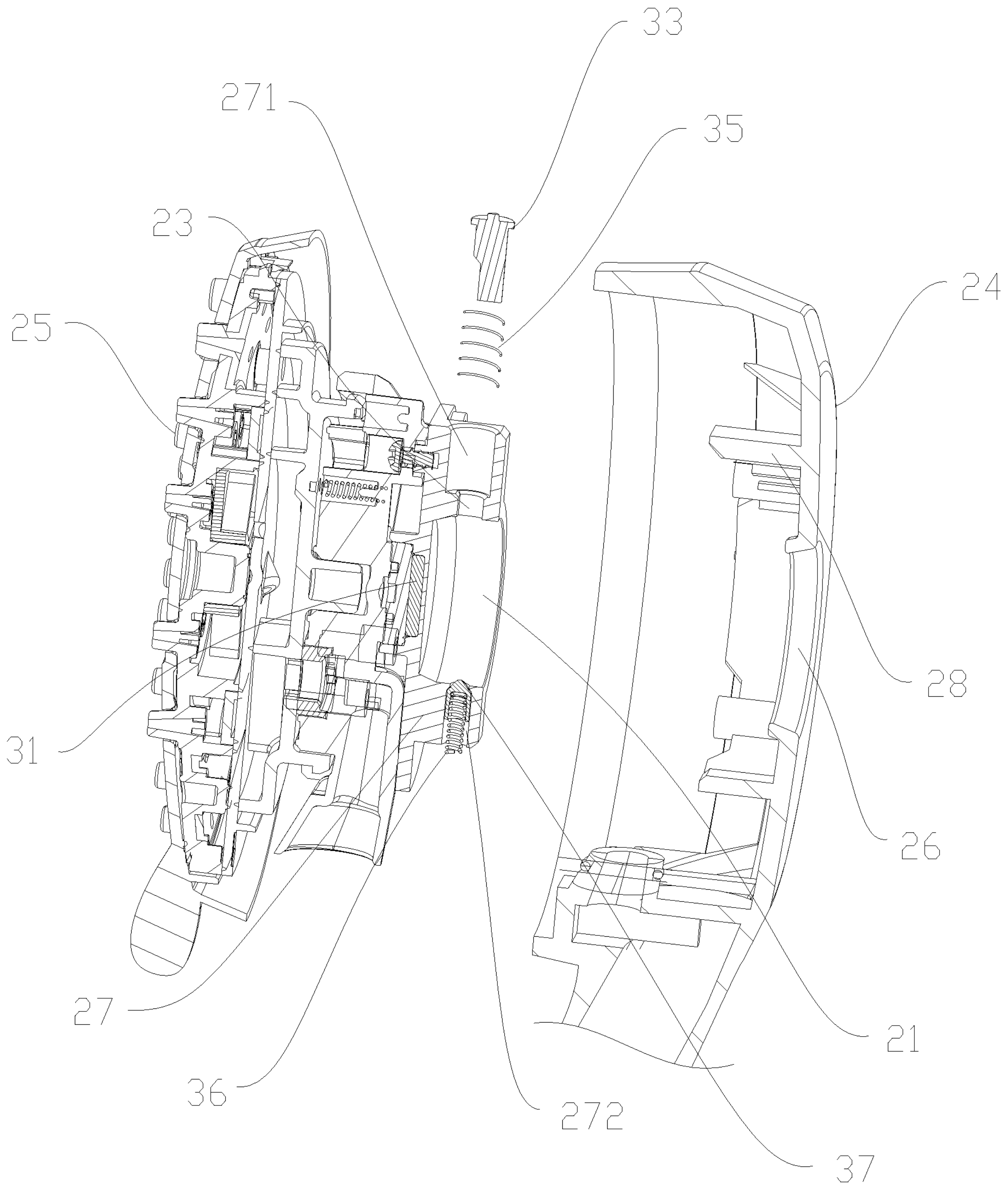
FIG. 5 is an exploded schematic diagram of the body in the present invention.

Refer to the attached drawings, a magnetic shower head, comprising a fixed seat 10 and a body 20, In use, the fixed seat can be connected to the wall or a fixed seat for the rosette head, the body is a handheld shower used by the consumer, the handheld shower can be moved close to or away from the fixed seat, and the handheld shower can be rotated relative to the fixed seat. Specifically: a groove 21 is formed at the back of the body, and a protruding part 11 that can extend into the groove is formed at the fixed seat, that is, when it is necessary to place the showerhead in the fixed seat, the user moves the groove of the body against the protruding part, referring to FIG. 4 of the accompanying drawings of the specification, so that the groove is socketed on the periphery of the protruding part. A first magnetic suction member 31 is formed at the end face of the bottom of the groove, and a second magnetic suction member 32 is formed at the protruding part, the second magnetic suction member is positioned in relation to the first magnetic suction member, the first magnetic suction member can be connected with the second magnetic suction member, through the action of the first magnetic suction member and the second magnetic suction member, it can play a guiding role, so that the body can be more conveniently put back to the fixed seat, a mounting space 22 which is located on a peripheral side of the groove is formed at the body, and the mounting space connected to the groove, a latch 33 is formed on the mounting space, and the latch can move along the radial direction of the groove and extend into the interior of the groove, a slot 12 is formed at a peripheral side of the groove that corresponds to the position of the latch, the latch is inserted inside the slot when the protruding part extend into the grooves, the latch can be cooperatively connected with the slot to connect the body and the fixed seat together, when the latch in the mounting space are inserted into the slots, the action of putting the body back into the fixed seat is accomplished.

Preferred, the peripheral side of the protruding part is also provided with a magnetic suction member 34 that can be cooperatively connected with the latch, and when the protruding part extends into the groove, the magnetic suction member can drive the latch to move along the radial direction of the groove toward the slot and insert it into the interior the slot, that is to say, through the magnetic suction effect of the magnetic suction member and the latch, the latch can be driven toward the slot and inserted in the slot, so that after the completion of the body is put back to the fixed seat, the stability of the overall structure is ensured, and it is ensured that the body will not fall down from the fixed seat. In an embodiment of the present invention, the first magnetic suction member and the second magnetic suction member mainly play a guiding role, when the body and the fixed seat close to the time, so that the two are connected together by magnetic adsorption, but also can play a pre-fixed role, will be connected to the body and the fixed seat together, in the insertion of latch into the slot, so that the body and the fixed seat fixed connection, to ensure that the body is not subjected to external forces to detach from the fixed seat.

Figure 2:
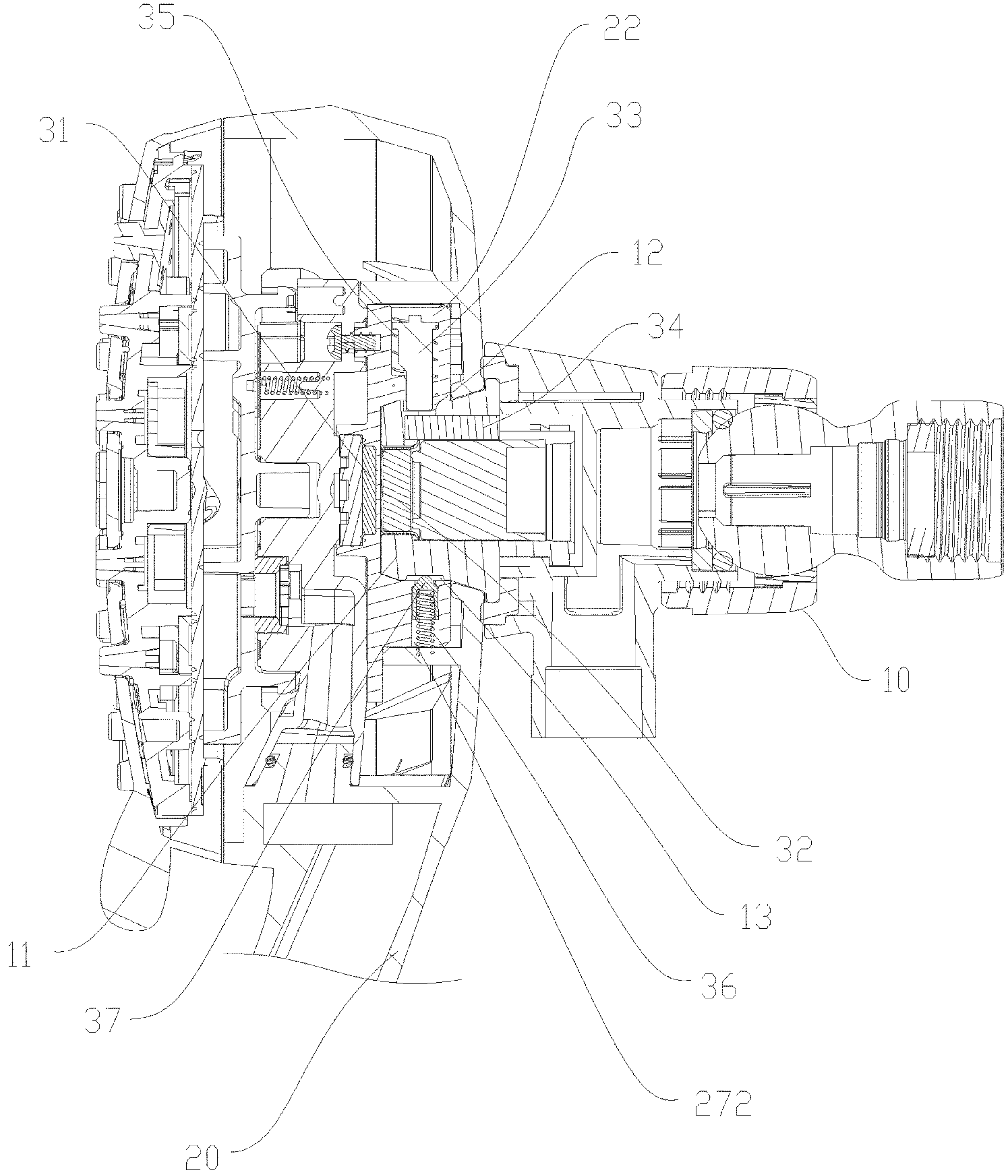
FIG. 2 is a schematic diagram I of state I of the present invention.
Figure 3:
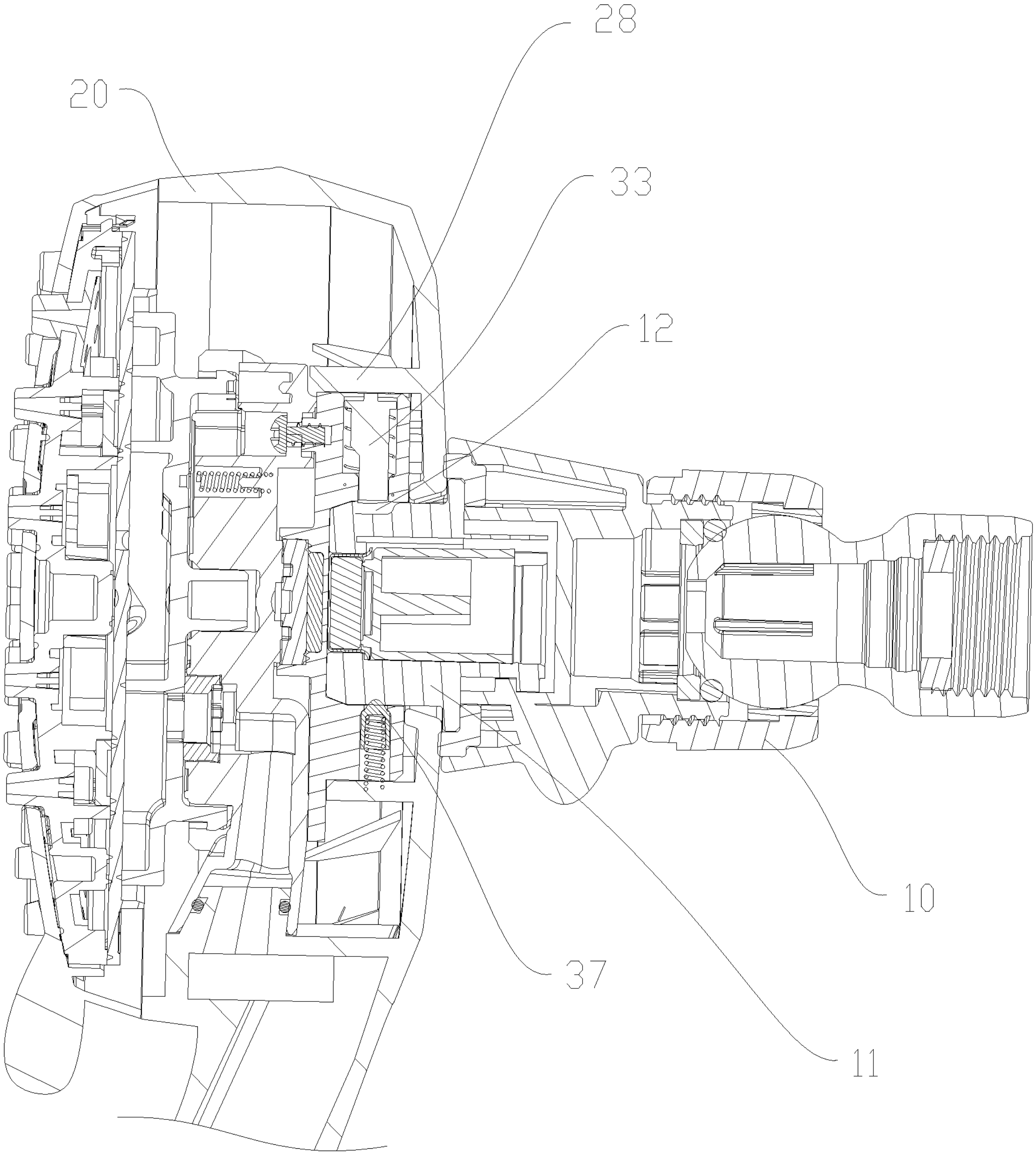
FIG. 3 is a schematic diagram I of state II of the present invention.

Further, an open pore 23 is formed between the mounting space and groove, and the mounting space is connected to the groove by the open pore, one end of the latch can pass through the open pore and extend into the slot, between one other end of the latch and one end of the mounting space near the groove are provided with a first spring, and the first spring is located in the mounting space and is in a state of compression in the radial direction along the groove, the first spring is capable of being matingly connected to the latch, the latch moving under the action of the first spring towards the side away from the slot, when the force of the first spring on the latch is greater than that of the magnetic suction member on the latch, the latch is not mated with the slot, and vice versa, the latch cooperates with the slot. In an embodiment of the present invention, when the magnetic suction member is facing the latch, with reference to FIG. 2 and FIG. 7 of the accompanying drawings of the specification, the latch can be inserted into the slot by the magnetic attraction of the magnetic suction member. If there is an angular deviation when the groove is inserted into the protruding part, that is to say, the latch has a certain angle with the magnetic suction member, at this time, the magnetic suction force of the magnetic suction member on the latch is less than the force exerted by the first spring on the latch, and at this time, it is in a pre-installed position, with reference to FIG. 3 and FIG. 6 of the accompanying drawings of the specification.

Figure 6:
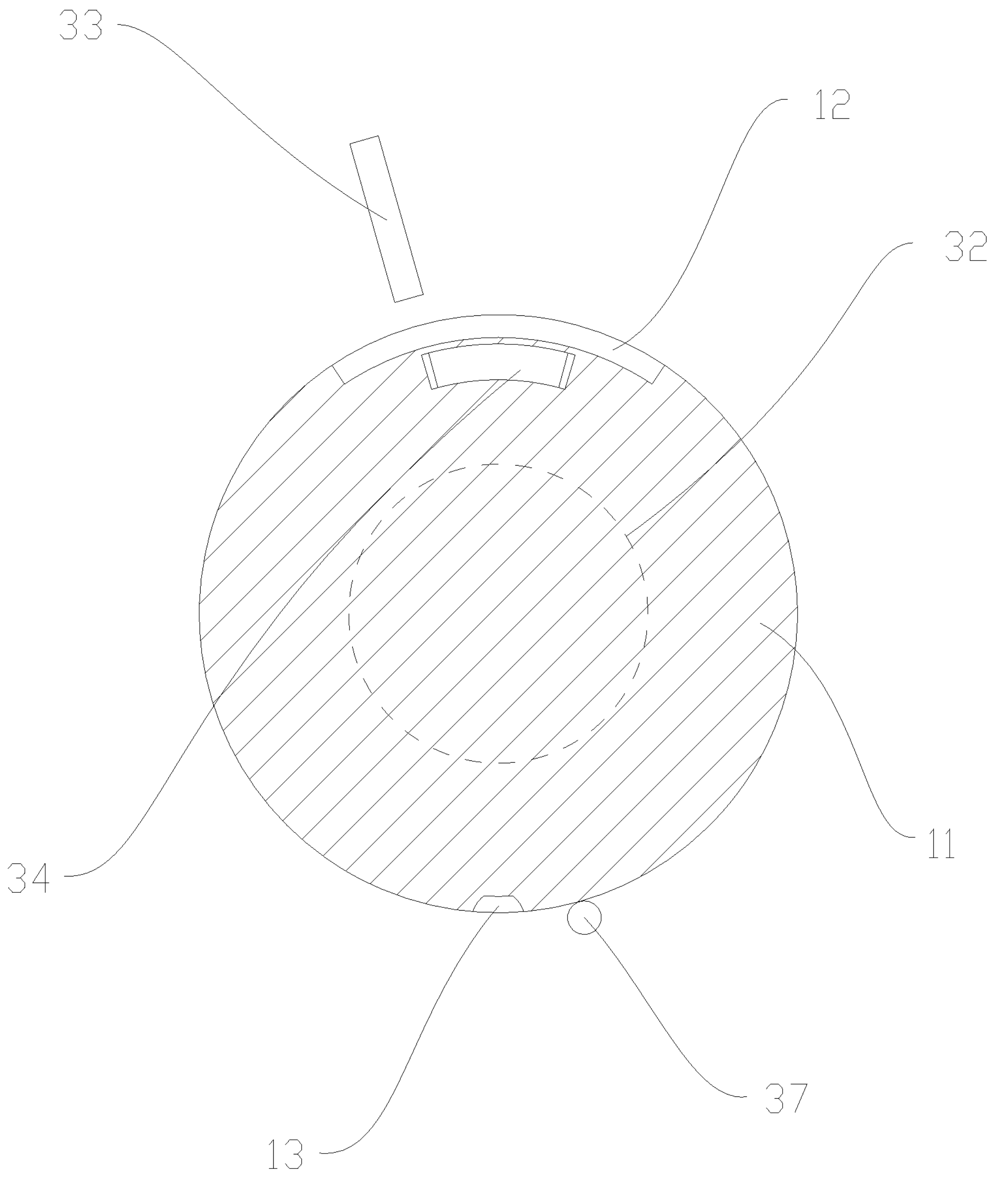
FIG. 6 is a schematic diagram II of state II of the present invention.
Figure 7:
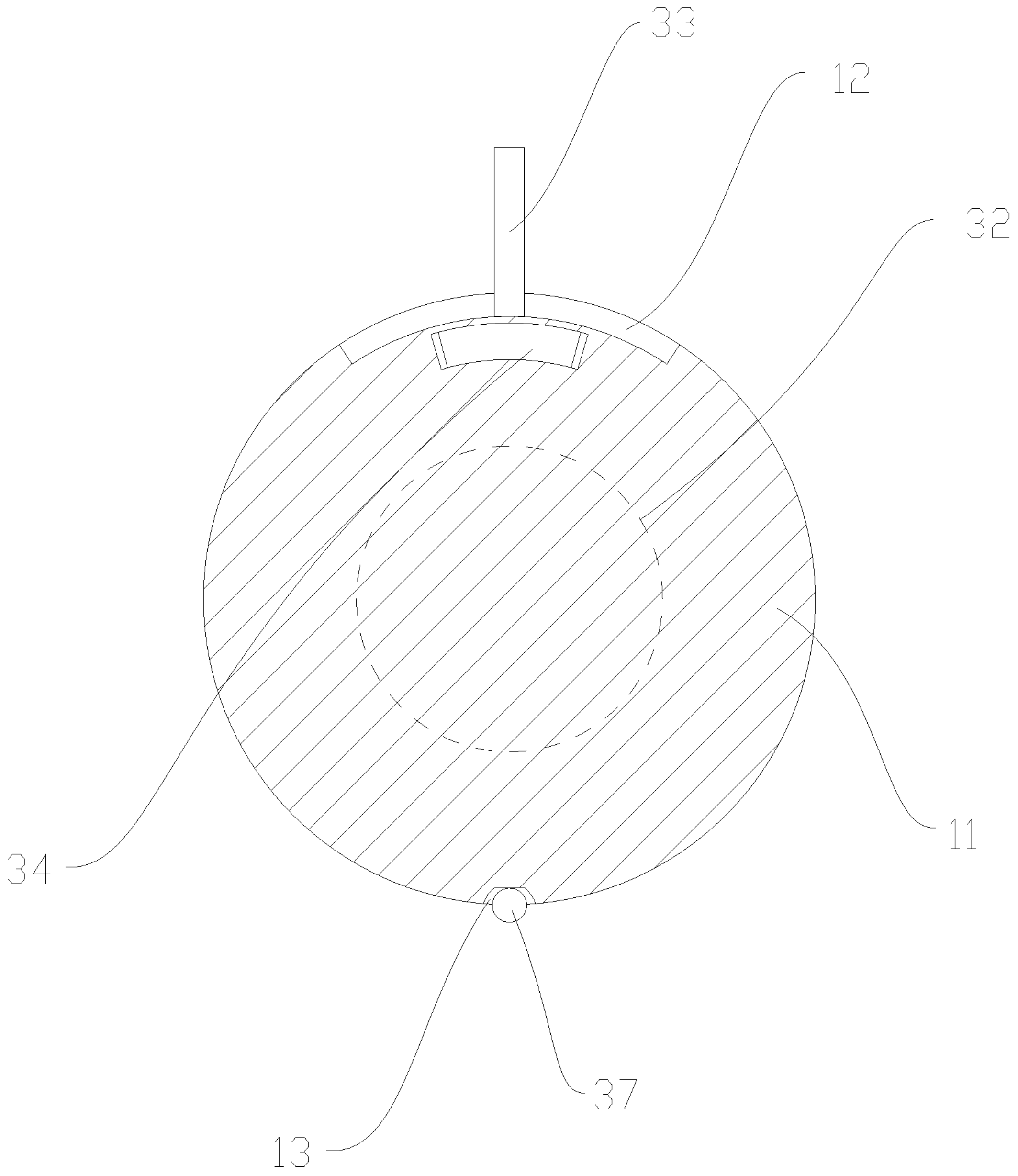
FIG. 7 is a schematic diagram II of state I of the present invention.

And furthermore, the slot is a curved slot provided on the outer peripheral wall of the protruding part, the slot extends in the direction of the outer peripheral side of the protruding part, that is to say, the length direction of the slot is the arc direction of the periphery of the protruding part, and the magnetic suction member is provided in the protruding part located in the inner periphery of the slot, with specific reference to FIGS. 6 and 7 of the accompanying drawings of the specification, at the same time the second magnetic suction member can be located on the inner peripheral side of the magnetic suction member, in this embodiment, the body is moved axially towards the fixed seat to realize the connection, and then the body is rotated, and then the body is moved back towards the fixed seat to realize the separation of the two.

Figure 8:
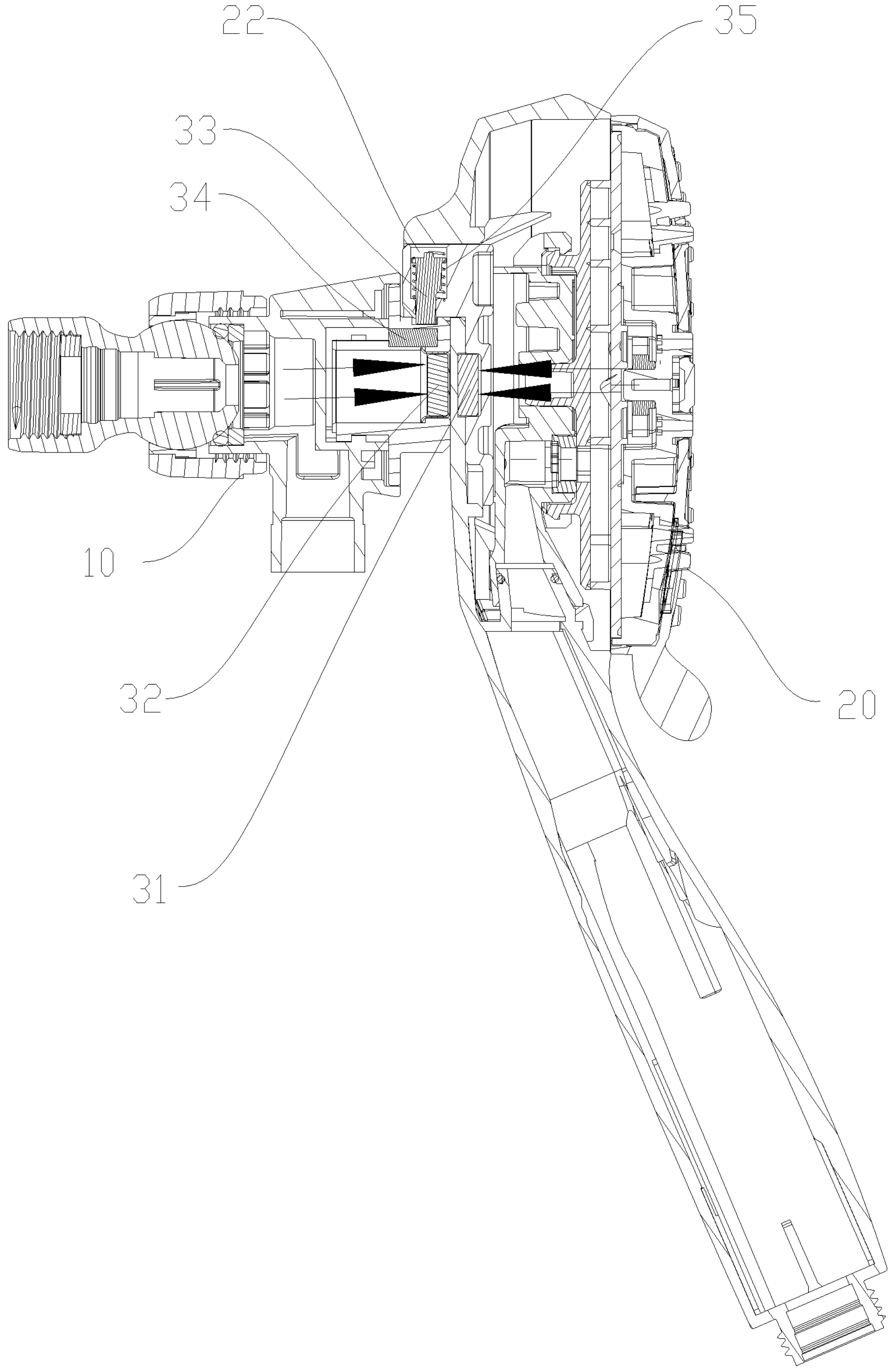
FIG. 8 is a schematic diagram of state one of another embodiment of the present invention.
Figure 9:
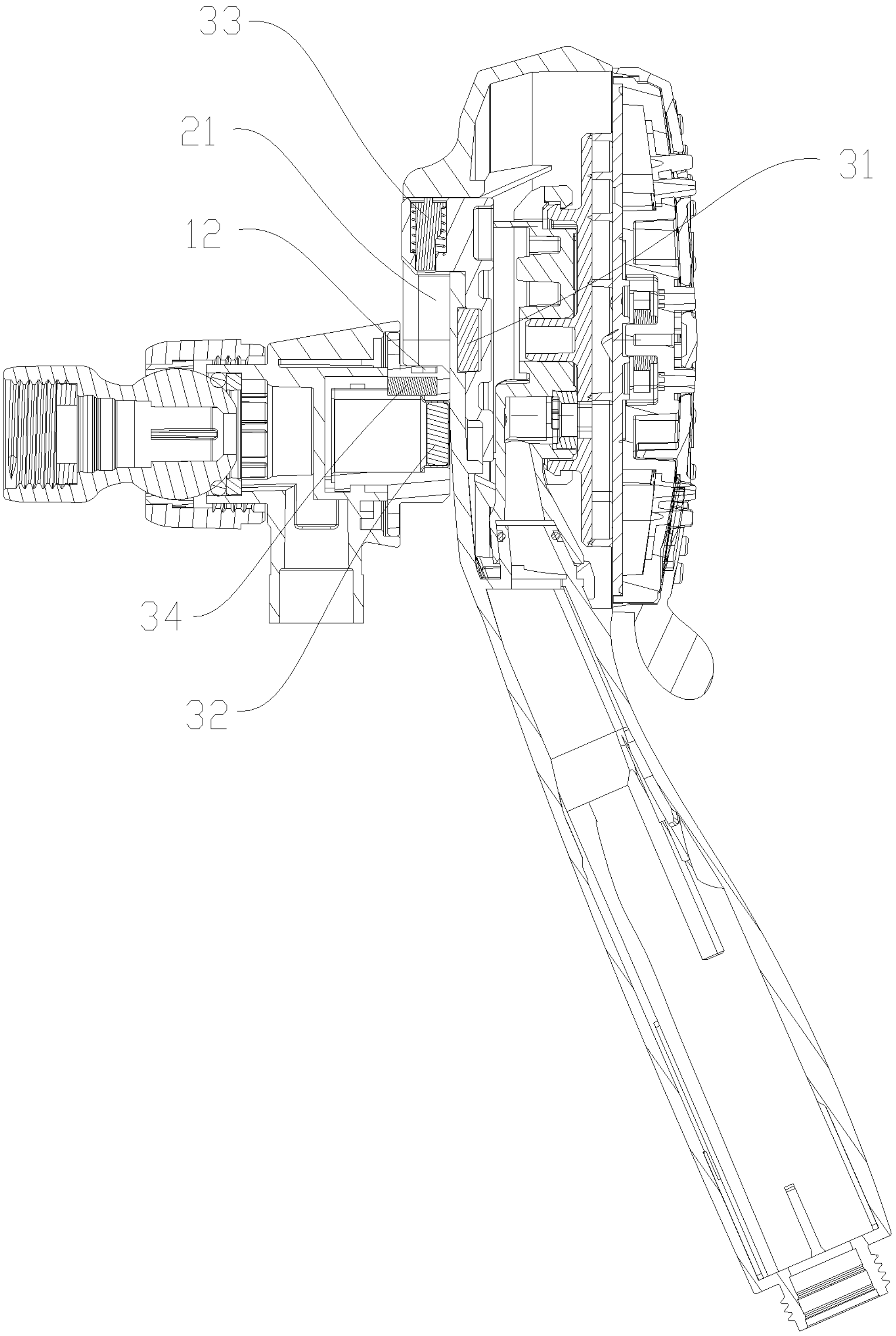
FIG. 9 is a schematic diagram of state two of another embodiment of the present invention.
Figure 10:
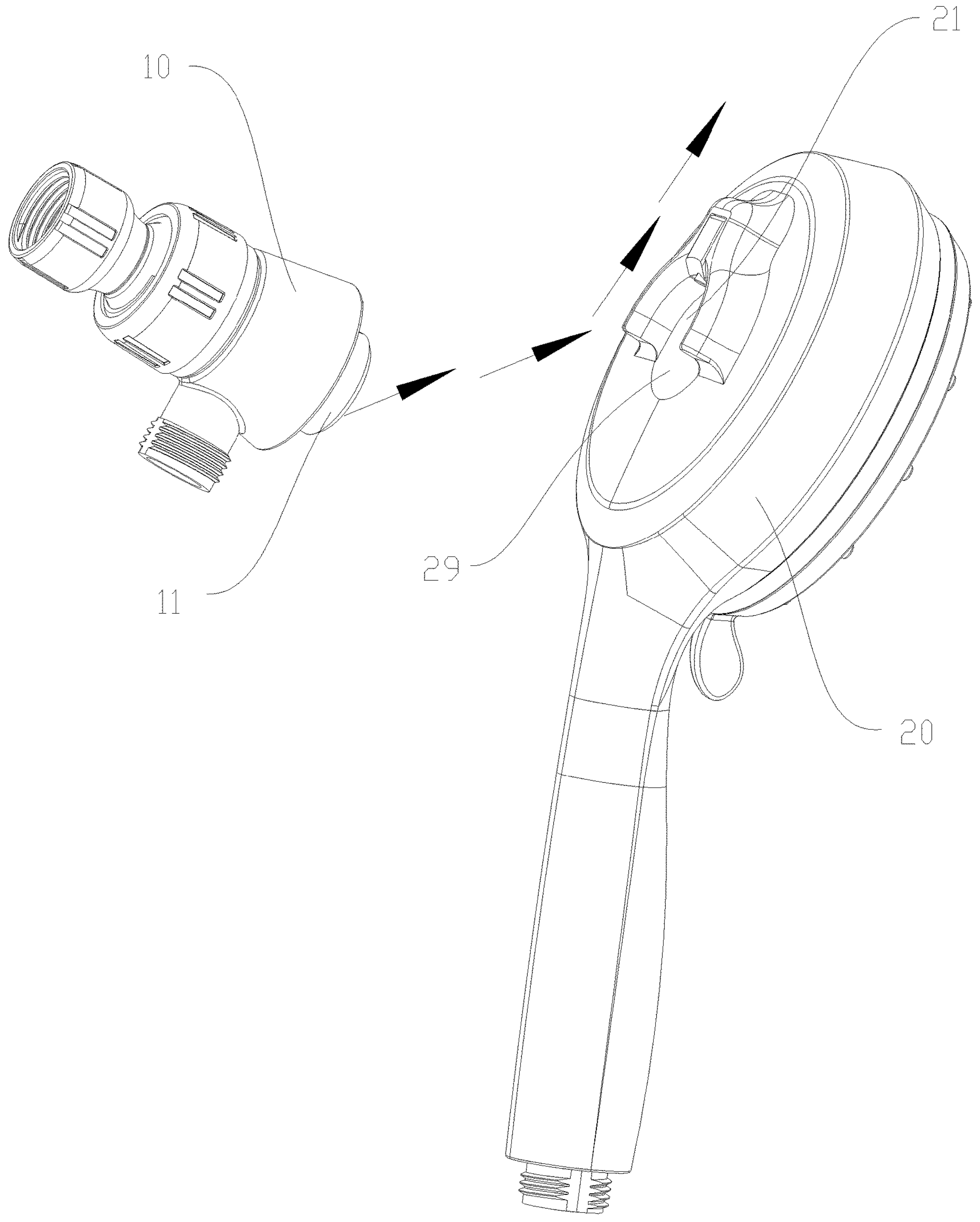
FIG. 10 is a schematic diagram of the fit of another embodiment of the present invention.

Referring to FIGS. 8-10 of the accompanying specification, in another embodiment of the present invention, the groove on the body has an insertion port 29 below, and the protruding part of the fixing seat is inserted into the groove from the insertion port, and then the body is more conveniently fixed to the fixed seat by the action of the first magnetic suction member and the second magnetic suction member, when the magnetic suction member cooperates magnetically with the latch, the latch is inserted into the slot of the protruding part after extending from the mounting space, realizing the fixation of the body and the fixed seat; when disassembling, the body is moved forward and upward, and the distance between the magnetic suction member and the latch increases, and the magnetic suction member's attraction to the latch is less than the elastic force of the first spring on the latch, and under the action of the elastic force, the latch is far away from the magnetic suction member, and the latch is unlocked, so that the showerhead can be removed by exerting force, this embodiment in one use, the slot may be a single hole, axially aligned with the direction of latch movement.

In use of the present invention I, through the action of the first spring, when the latch is not subject to the action of the magnetic suction member, the latch is retracted into the mounting space, and the latch cannot be seen in a flat view to ensure the overall appearance of the body neatness.

In an embodiment of the present invention, the body comprises a first body 24 and a panel 25 matingly connected, the first body can be a housing and a hand-held part, and the panel is mainly a water-over-water member, the groove is arranged at one end of the panel facing the first body, and the first body is provided with an opening 26 corresponding to the groove, and the protruding part can be inserted into the groove through the opening.

Further, one end of the panel facing the opening is provided with a convex boss 27, the middle of the convex boss is recessed to form the groove, the outer peripheral wall of the convex boss is recessed in the direction of the groove to form a first recessed portion 271 for installing the latch, the inner peripheral wall of the convex boss is provided with the open pore 23 that can match the first recessed portion, and the first body located on the outer peripheral side of the convex boss is provided with a baffle 28, the baffle and the first recessed portion cooperate to form the mounting space, so as to restrict the latch to the mounting space to ensure that they can not be completely detached from the mounting space.

Preferred, the convex boss is further provided with a second recessed portion 272, the second recessed portion is provided with a second spring 36 in a compressed state along the radial direction of the groove, and the second spring is matingly connected with a positioning bead 37, the peripheral wall of said raised portion is provided with a positioning recess 13, and the positioning bead is capable of being moved toward the positioning recess along the radial direction of the groove under the action of the second spring and matingly connected with the positioning recess, when the positioning bead is cooperatively connected with the positioning recess, the force of the first spring on the latch is less than the force of the magnetic suction member on the latch, and the latch is inserted into the slot, the baffle is an annular baffle, and first recessed portion is located at one end of the peripheral side of the convex boss and is matingly connected to the baffle, the second spring is located between the baffle and the positioning bead, the body is hooked to the fixed seat, when the first magnetic suction member and the second magnetic suction member are fully functioning, the body and the fixed seat have completed the pre-connection, at this time if the body is not mounted in place, the body will also be rotated around the protruding portion under its own gravity, when the body is rotated to the fixed position under its own gravity, at this time, the latch is inserted into the slot, the positioning beads fall into the positioning recess, there can be a ringing sound to inform the user that the body is placed in place, the body will not fall from the fixed seat, you can rest assured that you can use or leave. In a preferred embodiment of the present invention, the positioning recess is provided at the very bottom of the protruding part, and when the showerhead is in place, the latch is located directly above the positioning recess.

Specifically: by rotating the showerhead (body), controlling the relative position of the latch and the magnetic suction member inside the showerhead, controlling the magnitude of the magnetic suction force between the magnetic suction member and the latch, and then controlling the cooperation and unlocking between the latch and the fixed seat, realizing stable mechanical locking of the magnetic suction structure of the showerhead, enhancing the stability of the magnetic suction structure of the showerhead, and the showerhead is not easy to fall off.

In state one of the present invention, when the latch is adsorbed by the magnetic suction member to fix the shower, the latch moves in the direction of the magnetic suction member under the magnetic force of the magnetic suction member, and then gets stuck in the slot part of the fixed seat, so that the shower and the fixed seat are fixed together. In state one two, when the shower is rotated, the magnetic suction member and the latch are misplaced, the attraction of the magnetic suction member to the latch is less than the elastic force of the first spring to the latch, and under the action of the elastic force, the latch is moved away from the magnetic suction member, then the magnetic suction is unlocked, and the shower can be taken down with force. In the prior art, the two magnetic suction member are used to fix the shower and the fixed seat, so the suction force between the two is very large, and it takes a lot of force to remove the shower from the fixed seat, and the present invention does not use a lot of force, the fixing effect is mainly through the relationship between the latch and the slot, so that the shower can be removed from the fixed seat without using a lot of effort, rotate the shower, and the position of the magnetic suction member and the latch is staggered, so that the attraction of the magnetic suction member to the latch is less than the elasticity of the first spring to the latch, under the action of the elasticity of the first spring, the latch stay away from the magnetic suction member.

To put back the showerhead, there is the guidance of the interaction force between the first magnetic suction member and the second magnetic suction member, which makes it more convenient to put back the showerhead. Under the action of gravity, the shower always rotates back to the initial position from any side, and the initial position is the position of the body when the latch is inserted into the slot and the body is fixed on the fixed seat.

The present invention is more specific: 1. By setting up the magnetic suction member and the latch, the unlocking and fixing are realized by the action of the magnetic force of the magnetic suction member and the latch. When the latch is in the magnetic adsorption region of the magnetic suction member, under the action of the magnetic force, the latch is adsorbed by the magnetic suction member and moves in the direction of the magnetic suction member, and the latch is then stuck in the slot of the fixed seat, so that the showerhead and the fixed seat are fixed together. Rotate the shower, so that the position of the latch on the shower and the magnetic suction member move relative to each other, and the latch is separated from the maximum magnetic adsorption area of the magnetic suction member, at this time, the attraction of the magnetic suction member to the latch is less than the force of the first spring on the latch, and the latch is pushed away from the magnetic suction member by the first spring, so it is not fastened to the fixed seat, that is, the fastening between the fixed seat and the latch of the shower are released, so the user can easily take down the shower. 2. When putting back the shower, place the shower close to the fixed seat, and under the guidance of the magnetic force of the first magnetic suction member and the second magnetic suction member, the user can easily put the shower on the fixed seat. Under the action of gravity, the shower will reset the area with a large force between the magnetic suction member and the latch, then the latch re-secures the shower and the fixed seat together.

The present invention controls the acting distance between the latch and the magnetic suction member by rotating the shower, which is used to control the magnetic force of the magnetic suction member on the latch, when the shower is normally centered, the distance between the magnetic suction member and the latch is relatively close, at this time the magnetic force of the latch is large, and the latch moves toward the magnetic suction member under the action of magnetic force, and then gets stuck on the slot of the fixed seat, fixing the shower and the fixing seat together; when rotating the shower, the magnetic suction member is away from the latch, and the latch is away from the magnetic suction member under the action of the first spring elasticity, and the mechanical locking structure between the shower and the fixed seat is unlocked at this time.

The foregoing description illustrates and describes the preferred embodiments of the present invention, and as previously mentioned, it should be understood that the present invention is not limited to the form disclosed herein, and should not be regarded as exclusive of other embodiments, but may be utilized in a variety of other combinations, modifications, and environments and is capable of being altered by the above teachings or by skill or knowledge in the relevant field, within the scope of the utility model concept described herein. And the alterations and changes made by those in the art that do not depart from the spirit and scope of the present invention shall all be within the scope of protection of the appended claims of the present invention.

What is claimed is:

1. A magnetic shower head, comprising a fixed seat and a body, wherein a groove is formed at a back of the body, and a protruding part is formed at the fixed seat, a first magnetic suction member is formed at an end face of a bottom of the groove, and a second magnetic suction member is formed at the protruding part, the first magnetic suction member is allowed to be connected to the second magnetic suction member;

a mounting space is formed at the body, a latch is formed on the mounting space and the latch is allowed to move along a radial direction of the groove and extend into an interior of the groove, a slot is formed at a peripheral side of the groove corresponding to a position of the latch, and the latch is allowed to be cooperatively connected to the slot to connect the body and the fixed seat together, wherein the protruding part is allowed to extend into the groove, and the mounting space is located on the peripheral side of the groove and connected to the groove, and a peripheral side of the protruding part is provided with a third magnetic suction member, the third magnetic suction member is allowed to be cooperatively connected to the latch, and when the protruding part extends into the groove, the third magnetic suction member is allowed to drive the latch to move along the radial direction of the groove toward the slot and insert the latch into an interior of the slot.

2. The magnetic shower head according to claim 1, wherein an open pore is formed between the mounting space and the groove, a first end of the latch is allowed to pass through the open pore and extend into the slot, a first spring is provided between a second end of the latch and an end of the mounting space near the groove, and the first spring is located in the mounting space and is in a state of compression in the radial direction along the groove; when a force of the first spring on the latch is greater than a force of the third magnetic suction member on the latch, the latch is not mated with the slot.

3. The magnetic shower head according to claim 2, wherein the body comprises a first body and a panel matingly connected, the groove is arranged at an end of the panel facing the first body, and the first body is provided with an opening corresponding to the groove, and the protruding part is allowed to be inserted into the groove through the opening.

4. The magnetic shower head according to claim 3, wherein the end of the panel facing the opening is provided with a convex boss, a middle of the convex boss is recessed to form the groove, an outer peripheral wall of the convex boss is recessed in a direction of the groove to form a first recessed portion for installing the latch, an inner peripheral wall of the convex boss is provided with the open pore, and the first body located on an outer peripheral side of the convex boss is provided with a baffle, the baffle and the first recessed portion cooperate to form the mounting space, wherein the open pore is allowed to match the first recessed portion.

5. The magnetic shower head according to claim 4, wherein the convex boss is further provided with a second recessed portion, the second recessed portion is provided with a second spring in a compressed state along the radial direction of the groove, and the second spring is matingly connected to a positioning bead, a peripheral wall of the protruding part is provided with a positioning recess, and the positioning bead is allowed to be moved toward the positioning recess along the radial direction of the groove under an action of the second spring and matingly connected to the positioning recess.

6. The magnetic shower head according to claim 5, wherein when the positioning bead is cooperatively connected to the positioning recess, the force of the first spring on the latch is less than the force of the third magnetic suction member on the latch, and the latch is inserted into the slot.

7. The magnetic shower head according to claim 6, wherein the baffle is an annular baffle, and the first recessed portion is located at an end of the outer peripheral side of the convex boss and is matingly connected to the baffle, the second spring is located between the baffle and the positioning bead.

8. The magnetic shower head according to claim 1, wherein the slot is a curved slot provided on an outer peripheral wall of the protruding part, the slot extends in a direction of an outer peripheral side of the protruding part, and the third magnetic suction member is provided in the protruding part located in an inner periphery of the slot.

9. The magnetic shower head according to claim 8, wherein the body comprises a first body and a panel matingly connected, the groove is arranged at an end of the panel facing the first body, and the first body is provided with an opening corresponding to the groove, and the protruding part is allowed to be inserted into the groove through the opening.

10. The magnetic shower head according to claim 1, wherein the body comprises a first body and a panel matingly connected, the groove is arranged at an end of the panel facing the first body, and the first body is provided with an opening corresponding to the groove, and the protruding part is allowed to be inserted into the groove through the opening.

11. The magnetic shower head according to claim 10, wherein the end of the panel facing the opening is provided with a convex boss, a middle of the convex boss is recessed to form the groove, an outer peripheral wall of the convex boss is recessed in a direction of the groove to form a first recessed portion for installing the latch, an inner peripheral wall of the convex boss is provided with an open pore, and the first body located on an outer peripheral side of the convex boss is provided with a baffle, the baffle and the first recessed portion cooperate to form the mounting space, wherein the open pore is allowed to match the first recessed portion.

12. The magnetic shower head according to claim 11, wherein the convex boss is further provided with a second recessed portion, the second recessed portion is provided with a second spring in a compressed state along the radial direction of the groove, and the second spring is matingly connected to a positioning bead, a peripheral wall of the protruding part is provided with a positioning recess, and the positioning bead is allowed to be moved toward the positioning recess along the radial direction of the groove under an action of the second spring and matingly connected to the positioning recess.

13. The magnetic shower head according to claim 12, wherein when the positioning bead is cooperatively connected to the positioning recess, a force of a first spring on the latch is less than a force of a third magnetic suction member on the latch, and the latch is inserted into the slot.

14. The magnetic shower head according to claim 13, wherein the baffle is an annular baffle, and the first recessed portion is located at an end of the outer peripheral side of the convex boss and is matingly connected to the baffle, the second spring is located between the baffle and the positioning bead.

15. The magnetic shower head according to claim 1, wherein the body comprises a first body and a panel matingly connected, the groove is arranged at an end of the panel facing the first body, and the first body is provided with an opening corresponding to the groove, and the protruding part is allowed to be inserted into the groove through the opening.

16. The magnetic shower head according to claim 15, wherein the end of the panel facing the opening is provided with a convex boss, a middle of the convex boss is recessed to form the groove, an outer peripheral wall of the convex boss is recessed in a direction of the groove to form a first recessed portion for installing the latch, an inner peripheral wall of the convex boss is provided with an open pore, and the first body located on an outer peripheral side of the convex boss is provided with a baffle, the baffle and the first recessed portion cooperate to form the mounting space, wherein the open pore is allowed to match the first recessed portion.

17. The magnetic shower head according to claim 16, wherein the convex boss is further provided with a second recessed portion, the second recessed portion is provided with a second spring in a compressed state along the radial direction of the groove, and the second spring is matingly connected to a positioning bead, a peripheral wall of the protruding part is provided with a positioning recess, and the positioning bead is allowed to be moved toward the positioning recess along the radial direction of the groove under an action of the second spring and matingly connected to the positioning recess.

18. The magnetic shower head according to claim 17, wherein when the positioning bead is cooperatively connected to the positioning recess, a force of a first spring on the latch is less than a force of a third magnetic suction member on the latch, and the latch is inserted into the slot.

19. The magnetic shower head according to claim 18, wherein the baffle is an annular baffle, and the first recessed portion is located at an end of the outer peripheral side of the convex boss and is matingly connected to the baffle, the second spring is located between the baffle and the positioning bead.

* * * * *